(12) United States Patent
Jury et al.

(10) Patent No.: US 10,068,597 B1
(45) Date of Patent: Sep. 4, 2018

(54) HEAD WITH MULTIPLE READERS CONFIGURED FOR READING INTERLACED MAGNETIC RECORDING TRACKS

(71) Applicant: Seagate Technology LLC, Cupertino, CA (US)

(72) Inventors: Jason Charles Jury, Apple Valley, MN (US); Steven Douglas Granz, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/873,160

(22) Filed: Jan. 17, 2018

(51) Int. Cl.
| | |
|---|---|
| *G11B 15/14* | (2006.01) |
| *G11B 5/596* | (2006.01) |
| *G11B 5/48* | (2006.01) |
| *G11B 5/012* | (2006.01) |
| *G11B 5/39* | (2006.01) |
| *G11B 5/55* | (2006.01) |

(52) U.S. Cl.
CPC ............ *G11B 5/4886* (2013.01); *G11B 5/012* (2013.01); *G11B 5/3948* (2013.01); *G11B 5/3967* (2013.01); *G11B 5/5526* (2013.01); *G11B 5/59688* (2013.01)

(58) Field of Classification Search
CPC ......... G11B 3/05; G11B 3/06; G11B 2220/90; G11B 20/1205; G11B 15/14; G11B 15/125; G11B 5/59633; G11B 5/59627; G11B 5/5547; G11B 5/5521; G11B 5/5526; G11B 5/553; G11B 3/08512; G11B 3/08503

USPC .............................. 360/77.06, 78.08, 50, 64
See application file for complete search history.

(56) References Cited

U.S. PATENT DOCUMENTS

| | | | |
|---|---|---|---|
| 6,104,562 A | 8/2000 | Ottesen et al. | |
| 7,982,944 B2 | 7/2011 | Erden et al. | |
| 8,837,068 B1 | 9/2014 | Liao et al. | |
| 8,873,178 B2 * | 10/2014 | Erden ................ | G11B 20/1217 360/39 |
| 8,922,947 B2 | 12/2014 | Erden et al. | |
| 9,401,161 B1 | 7/2016 | Jury et al. | |
| 2013/0250447 A1 | 9/2013 | Erden | |
| 2013/0286502 A1 | 10/2013 | Erden et al. | |
| 2014/0022877 A1 | 1/2014 | Ong et al. | |
| 2014/0043708 A1 | 2/2014 | Erden et al. | |
| 2016/0035384 A1 | 2/2016 | Hwang et al. | |
| 2016/0148645 A1 | 5/2016 | Zhu et al. | |
| 2017/0200468 A1 | 7/2017 | Zhu et al. | |

* cited by examiner

*Primary Examiner* — Nabil Hindi
(74) *Attorney, Agent, or Firm* — Hollingsworth Davis, LLC

(57) ABSTRACT

First tracks of a disk are read via a first read transducer. The first read transducer has a first crosstrack width and a first shield-to-shield spacing that are optimized to read a first track width and a first linear bit density of the first tracks. Second tracks interlaced between the first tracks are read via a second read transducer. The second read transducer has a second crosstrack width different from the first crosstrack width and second shield-to-shield spacing different than the first shield-to-shield spacing. The second crosstrack width and the second shield-to-shield spacing are optimized to read a second track width different from the first track width and a second linear bit density different from the first linear bit density.

20 Claims, 6 Drawing Sheets

HEAD WITH MULTIPLE READERS CONFIGURED FOR READING INTERLACED MAGNETIC RECORDING TRACKS

SUMMARY

Various embodiments described herein are generally directed to a head with multiple readers configured for reading interlaced magnetic recording tracks. In one embodiment, an apparatus includes a read head with a first read transducer having a first crosstrack width and a first shield-to-shield spacing that are optimized to read a first track width and a first linear bit density. The read head includes a second read transducer with a second crosstrack width different from the first crosstrack width and second shield-to-shield spacing different than the first shield-to-shield spacing. The second crosstrack width and the second shield-to-shield spacing are optimized to read a second track width different from the first track width and a second linear bit density different from the first linear bit density. A controller is coupled to the read head and operable to selecting the first read transducer for reading a first set of tracks having the first track width and the first linear bit density. The controller is further operable to select the second read transducer for reading a second set of tracks interlaced between the first set of tracks, the second set of tracks having the second track width and the second linear bit density.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Recording schemes have been developed to increase areal density for conventional recording devices, e.g., perpendicular magnetic recording (PMR) as well as devices using newer technologies, such as heat-assisted magnetic recording (HAMR), microwave-assisted magnetic recording (MAMR). One of these recording schemes is interlaced magnetic recording (IMR), which generally involves writing some tracks that partially overlap previously written tracks. This allows writing the tracks at a narrower width than would be possible in conventional recording schemes, where tracks are spaced apart to prevent crosstrack interference. While IMR-recorded tracks cannot be randomly updated as easily as conventionally recorded tracks, the drive architecture can be adapted to minimize the effects on random writes.

In a disk drive utilizing interleaved magnetic recording (IMR), there are two types of data tracks written. The first is a bottom track, which is generally written at higher linear density using a wider write head, or using a write configuration that results in a wider track being written. The second is a top track, which is generally written at lower linear density using a narrower write head, or using a write configuration that results in a wider track being written. The bottom tracks are written first, with a relatively wide spacing therebetween, and then the top tracks are written in the spacing between adjacent top tracks. The intent of writing the top tracks is to encroach enough on the adjacent bottom tracks to partially overwrite the bottom track edges. Because these track edges tend to have poorer SNR than the middle of the track, overwriting them has a minor impact on the overall bottom track SNR.

The different characteristics of the top and bottom IMR tracks can complicate reading back the data from those tracks. The top and bottom tracks will usually have different characteristics, including track width, linear bit-density, signal-to-noise ratio, etc. If these characteristics are mismatched with those of the read transducer, a higher error rate may result, and some data may be lost. As will be described below, an arrangement of multiple read elements per read head can be selected such to improve performance of IMR drives (e.g., reduce read error rate) yet still provide the high areal density afforded by IMR.

Figure 1:
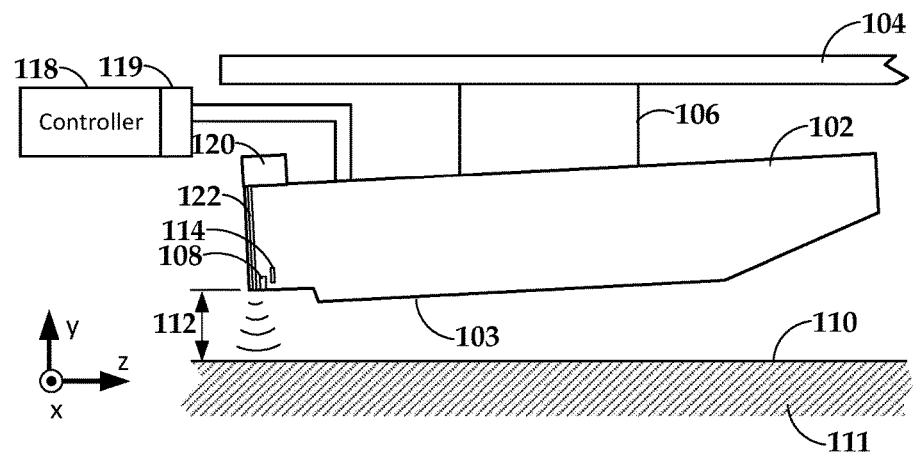
FIG. 1 is a diagram illustrating a magnetic recording device according to an example embodiment.

In FIG. 1, a block diagram shows a side view of a read/write head 102 (also referred to as a "read head," "write head," "recording head," etc.) according to an example embodiment. The read/write head 102 may also be referred to herein as a write head, read head, recording head, etc. The read/write head 102 is part of slider that is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 may be configured as a HAMR or MAMR device, and so includes additional components that assist the read/write transducer 108. In a HAMR embodiment, these components may include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 in a HAMR drive include a magnetic coil and pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions. If the device is configured for MAMR, a spin-torque oscillator (STO) may be used with the read/write transducer 108 to generate a powerful but localized magnetic field.

The read/write transducer 108 of the read/write head 102 includes two or more read elements, such as magneto-resistive stacks. The read elements are used to form an electrical signal that varies with changes in magnetic field on the recording medium 111. For example, a magneto-resistive element will change resistance in response to changes in local magnetic field. A current passing through the element will vary based on the changes in resistance.

Figure 2:
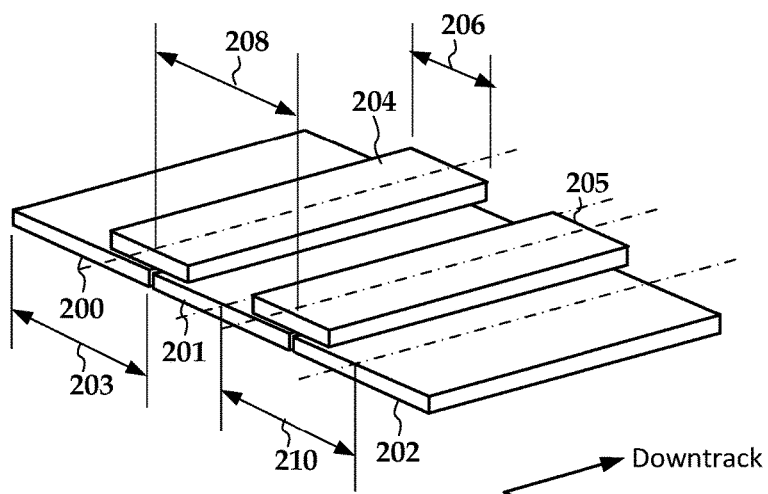
FIG. 2 is a diagram illustrating interlaced magnetic recording tracks according to an example embodiment.

In FIG. 2, a block diagram illustrates IMR tracks according to an example embodiment. In this IMR process, bottom tracks 200-202 are first written the recording medium using a bottom track width 203 and at bottom track pitch 210. Top tracks 204, 205 are then written partially overlapping between respective bottom tracks 200-202, and therefore are interlaced between the bottom tracks 200-202. The top tracks are written at a top track width 206 and at top track pitch 208.

Because the bottom tracks 200-202 are written at a relatively large cross-track separation from one another, the bottom tracks 200-202 can be written using a relatively larger width 203 than the top tracks 204, 205 without risk of adjacent track erasure. The larger width 203 enables recording the bottom tracks 200-202 at relatively higher linear bit density than that of the top tracks 204, 205. For a HAMR device, the different widths 203, 206 can be achieved by varying laser power to vary the size of the hotspot in the recording medium. The width and linear bit density of the top and bottom tracks 204, 205, 200-202 define the bit-aspect ratio (BAR) of the respective tracks.

Because individual recording heads and media will have different characteristics due to manufacturing tolerances, each drive may have different top and bottom BAR values that are optimum. In some cases, BAR may be different for different disk surfaces within a drive, and different for different zones within a disk surface. For example, in a HAMR drive, a selected combination of laser power (LDI) and linear bit density (BPI) will produce a selected BAR for a particular recording regions. Because LDI's effect on track width will also have an effect on adjacent track spacing (TPI), the value of TPI may also be defined together with the selected BAR. The combination of BPI and TPI defines the areal density (ADC) for the region being considered.

Figure 3:
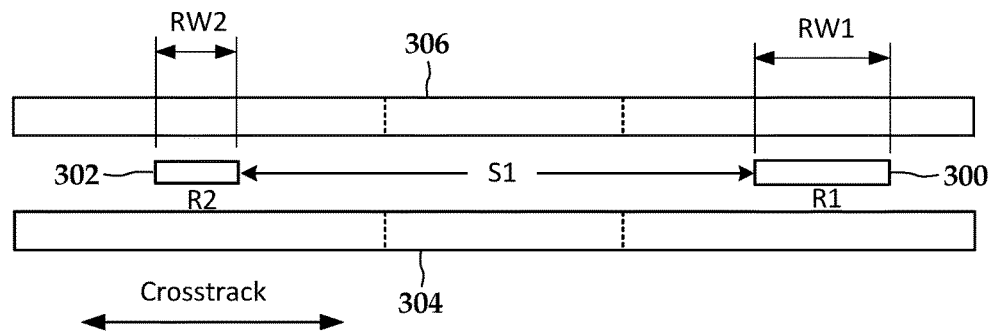
FIG. 3 is a block diagram illustrating read transducers according to an example embodiment.
Figure 4:
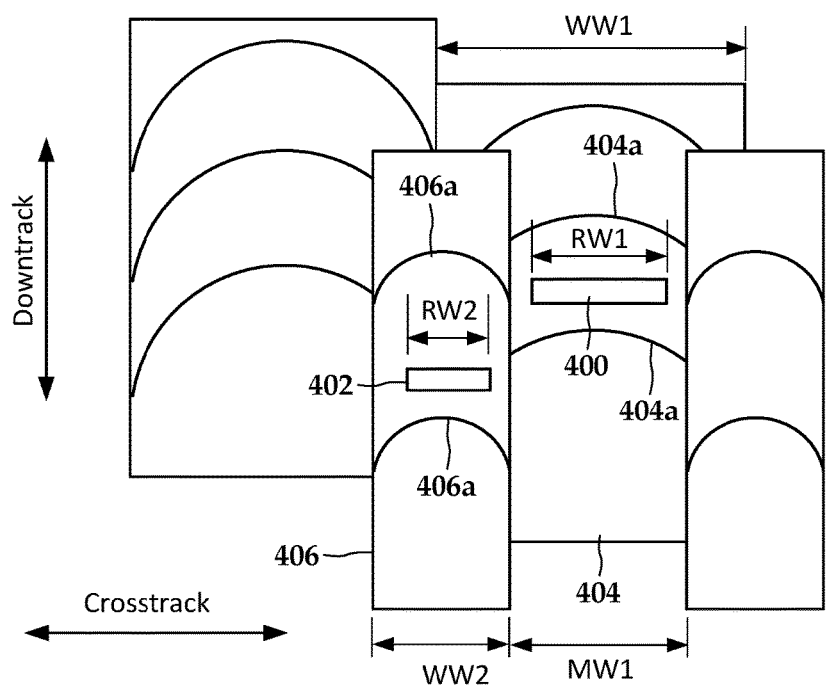
FIG. 4 is a block diagram illustrating read transducers and interlaced magnetic recording tracks according to an example embodiment.

In FIGS. 3 and 4, block diagrams show examples of multiple readers with different design characteristics for IMR. In FIG. 3, a diagram shows a view of read transducers 300, 302 as seen from the ABS of a read/write head. The read transducers 300, 302 are formed over a lower shield 304 and have different widths RW1, RW2. An upper shield 306 is formed on top of the read transducers 302, 302. The shields 304, 306 may be joined as shown or separate, the latter indicated by the dashed lines. Generally, this configuration can be formed using a simplified fabrication process, as the read transducers 300, 302 are generally aligned in a downtrack direction (e.g., co-planar), such that the multiple steps used to produce a reader (e.g., layer deposition, etching, liftoff, planarization, etc.) can be used to form both readers 300, 302 simultaneously. Similarly, even if each of the shields 304, 306 are not one-piece (e.g., discontinuous at region between dashed lines), they are co-planar and so each shield part can be formed simultaneously by the same process steps.

One issue with an arrangement as shown in FIG. 3 is that the read transducers 300, 302 may need to be separated in a cross-track direction (left to right in this figure) by a distance S1 to prevent interference. Because the distance S1 is much greater than adjacent track pitch (e.g., S1 on the order of micrometers), the read transducers 300, 302 may be used separately most of the time. This does not preclude reading every Nth track simultaneously, where S1 corresponds to the N times the track pitch. However the effects of skew will mean the number N could change at some skew angles. Further, because the read transducers 300, 302 are optimized for different adjacent IMR tracks, the number N may be limited to odd-numbers.

In FIG. 4, read transducers 400, 402 have different widths RW1, RW2, similar to the reader widths in FIG. 3. In this example, the read transducer 400, 402 have a downtrack offset, and therefore can be placed together close enough in the crosstrack direction (e.g., roughly the same distance as the adjacent track pitch) to read adjacent IMR tracks 404, 406, respectively. Track 404 is a bottom track and track 406 is a top track. As seen in this figure, the bottom track 404 is written at width WW1 and the top track 406 is written at width WW2. Because the bottom track 404 is partially overwritten on either side by top tracks, it has a magnetic width MW1. The magnetic width of the top track is generally the same as its written width, WW2.

The curved lines 404a, 406a in the tracks 404, 406 represent magnetic transitions that define bits written to the tracks 404, 406. In some devices, e.g., HAMR drives, transitions 404a, 406a may be curved as shown, as the laser forms a roughly circular hotspot on the media, and this hotspot is where the magnetic orientation is changed during recording. Note that transitions 404a are more closely spaced in the downtrack direction than transitions 406, due to the greater bit density of bottom tracks in IMR.

Figure 5:
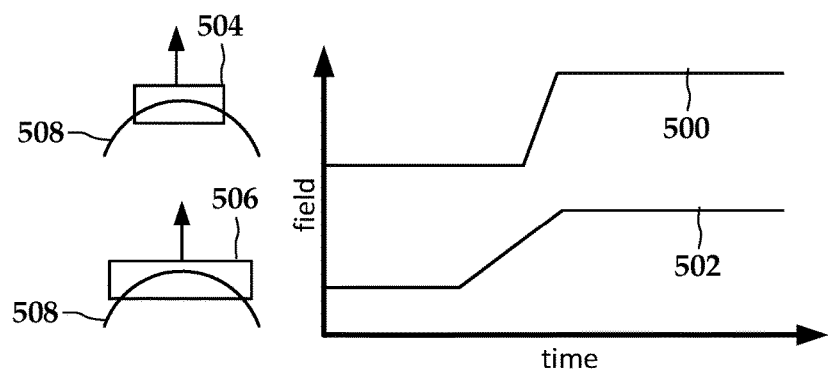
FIG. 5 is a plot illustrating effect of reader width on signal according to an example embodiment.

Because of the curvature of the transitions 404a, 406a, the optimal targets for RW1 to RW2 are likely different. This is shown in FIG. 5, where a graph shows signals 500, 502 from respective narrower 504 and wider 506 readers as they move over the same-sized curved transition 508 in a direction indicated by the arrows. Because of the sharper angle of the curve 508 near its outer edges, the wider reader 506 makes a slower transition between field directions as shown in signal 502. This slower signal transition can make decoding the data more difficult and can reduce the allowable linear bit density. In reference again to FIG. 4, the relative size of the bit transitions 404a, 406a means that the bottom track 404 would benefit from a reader width that is a relatively larger percentage of the track's magnetic width MW1. Conversely, the top track 406 would benefit from a reader width that is a relatively smaller percentage of the track's magnetic width WW2.

Figure 6:
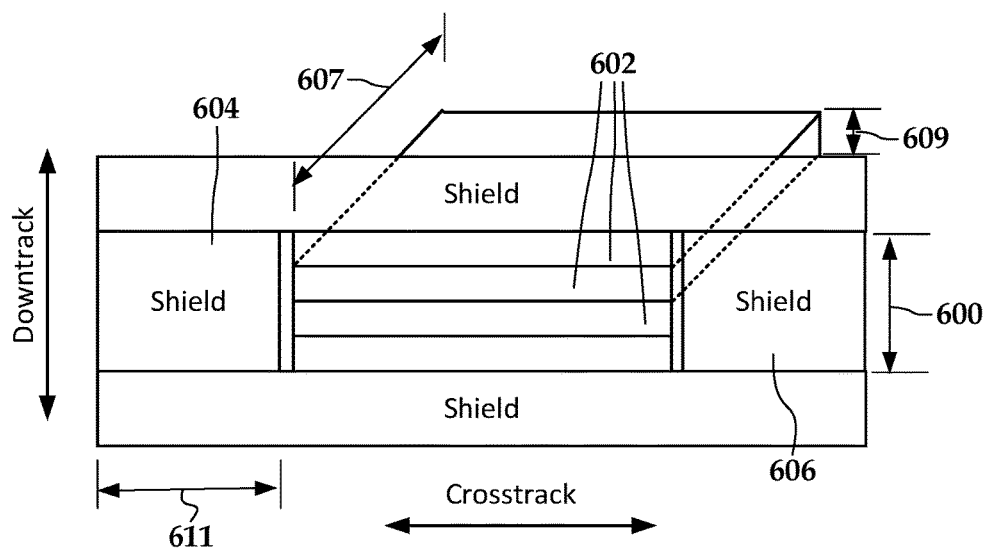
FIG. 6 is a block diagram of a read transducer according to an example embodiment.

In the embodiments described herein, the magnetic read transducers are generally optimized for the characteristics of a particular IMR data track (linear bit density and magnetic width). For example, the reader resolution is generally optimized for a target linear bit density. Optimizing the resolution of the reader leads to design choices. Some of these design choices according to an example embodiment are shown in the block diagram of a read transducer according to an example embodiment in FIG. 6. The target reader resolution will tend to define allowable shield-to-shield separation 600, which in turn leads to design choices about the various internal reader layers 602 and their thicknesses. For example, various types of magnetic sensors may be used (e.g., giant magnetoresistive using antiferromagnetic coupling layers, pseudospin valves, tunnel magnetoresistance, colossal magnetoresistance, extraordinary magnetoresistance, etc.) which will have different layer materials and thicknesses (e.g., thickness of the sensing layers). Other geometric considerations that may affect target reader resolution are sensor height 607 (in direction perpendicular to ABS) and width of side shields 604, 606. The multiple readers on a single read head described herein may also have different values of sensor layer thickness 609, sensor height 607, and side shield width 611, in any combination.

Read transducer signal amplitude and noise power are additional considerations when designing for different IMR tracks. At higher data rates used for higher linear density bottom track, greater signal amplitude and lower noise power are used to record the bottom tracks to achieve acceptable performance. Enabling these attributes also requires design choices for reader materials and layer thicknesses; adjusting the magnetic pinning fields to achieve higher amplitude by allowing greater rotation of magnetization in reader magnetic layers may also be necessary. All of these design choices also come with trade-offs for other reader characteristics like reliability and signal linearity, the latter related to read signal asymmetry and/or saturation. As a result of all these considerations, a reader design optimized for the bottom track will diverge from a reader design optimized for the top track.

Further, because of drastic bottom track vs. top track differences a different read transducer technology or even a different multiple reader configuration may be used for one or both of these track types. For example, because of the high linear density and corresponding difficult amplitude and noise requirements, to achieve required performance the bottom track may require multiple readers in a multiple signal/sensor magnetic recording (MSMR) configuration that uses two or more signals to read from a single track, the two or more signals being combined in the controller to detect and decode the bits. With an MSMR configuration, other design changes to the readers themselves might be necessary or enabled (e.g. some relaxation of amplitude or noise).

If different single readers are used for reading bottom vs. top tracks, it is possible to fabricate them using a non-MSMR process if a large cross-track reader-to-reader separation is acceptable. Such a fabrication process would be roughly twice as fast as normal 2-reader MSMR process which would provide substantial benefits.

Although IMR may benefit from using multiple readers with different design characteristics, any drive configuration that consists of two different types of data tracks would see benefit from this idea. For example, suppose a drive uses conventional magnetic recording (CMR) throughout but maximizes data rate near to the disk outer diameter (OD) and maximizes areal density near the middle diameter (MD) and inner diameter (ID). In such a drive, having two different readers (or reader configurations) would be advantageous: high data rates would optimize to a different reader design compared to high areal density. In other example, CMR may be used at the drive OD and shingled magnetic recording (SMR) is used to maximize areal density near the drive MD/ID. The CMR tracks with higher data rates would optimize to a different reader design than SMR tracks at higher areal density and lower data rates.

Figure 7:
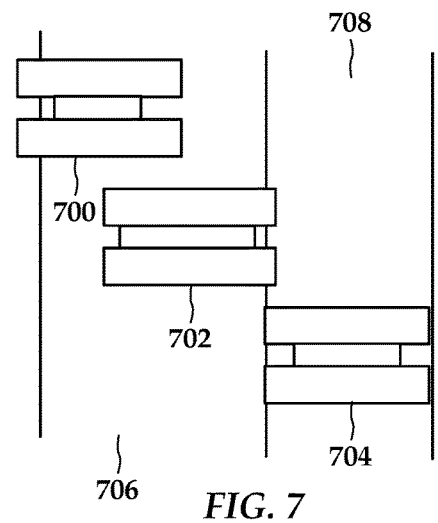
FIGS. 7 and 8 are diagrams of read transducer arrangements according to example embodiments.

In FIG. 7, a block diagram shows an arrangement of read transducers (also referred to as "readers") according to an example embodiment. Readers 700 and 702 are configured to read bottom track 706 in an MSMR mode while reader 704 is configured to read an adjacent top track 708. In this example, the readers 700, 702, 704 are of different cross-track widths, with reader 702 being the widest and reader 700 being the narrowest. This arrangement may provide flexibility in operation. For example on some regions of the disk (e.g., with high skew angle) a different set of readers may be used for top and bottom tracks. For example, in some configurations readers 702 and 704 may read a single (e.g., bottom) track and reader 700 would read an adjacent (e.g., top) track. In other configurations, all the readers 700, 702, 704 may read a single track together or all the readers 700, 702, 704 may read individual tracks.

Figure 8:
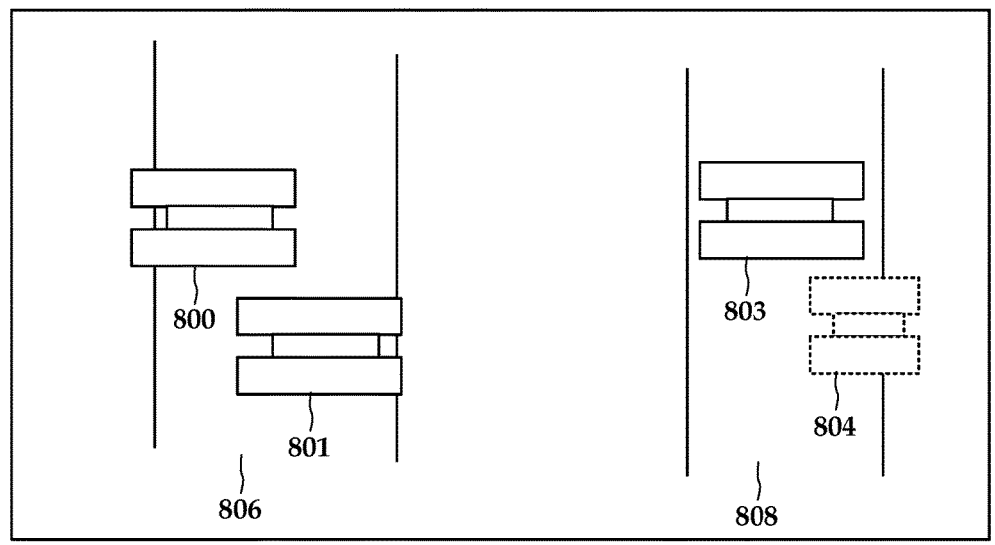

In FIG. 8, a block diagram shows an arrangement of readers according to another example embodiment. As with the previous arrangement, two readers 800, 801 are configured for MSMR reading of a track 806, e.g., a bottom track. Reader 803 is configured to read non-adjacent track 808 (e.g., top track). Note that readers 800, 803 may be co-planar, thereby simplifying manufacturing compared to the embodiment in FIG. 7. An optional further reader 804 may also be included, and the reader 804 may be co-planar with reader 801. This fourth reader 804 may be used for MSMR reader of track 808 together with reader 803. In other embodiments, any of the readers 800-804 may be configured, in some modes or media regions, to read single tracks in non-MSMR modes.

All of the embodiments for using readers with different design characteristics for two different types of tracks do not dependent of the writing process itself. In other words, these ideas relate only to the reading back of data from the tracks, not explicitly how they were written. The read heads described herein may be used with energy-assisted recording technologies such as HAMR, MAMR, and/or be used with PMR without any energy-assist recording technology. The parameters of the technology may be varying within the drive (e.g. IMR recording with HAMR/MAMR by using different levels of energy assist for bottom vs. top tracks), or the same technology may be used with multiple schemes (PMR recording in conventional and shingle modes for the two track types).

Figure 9:
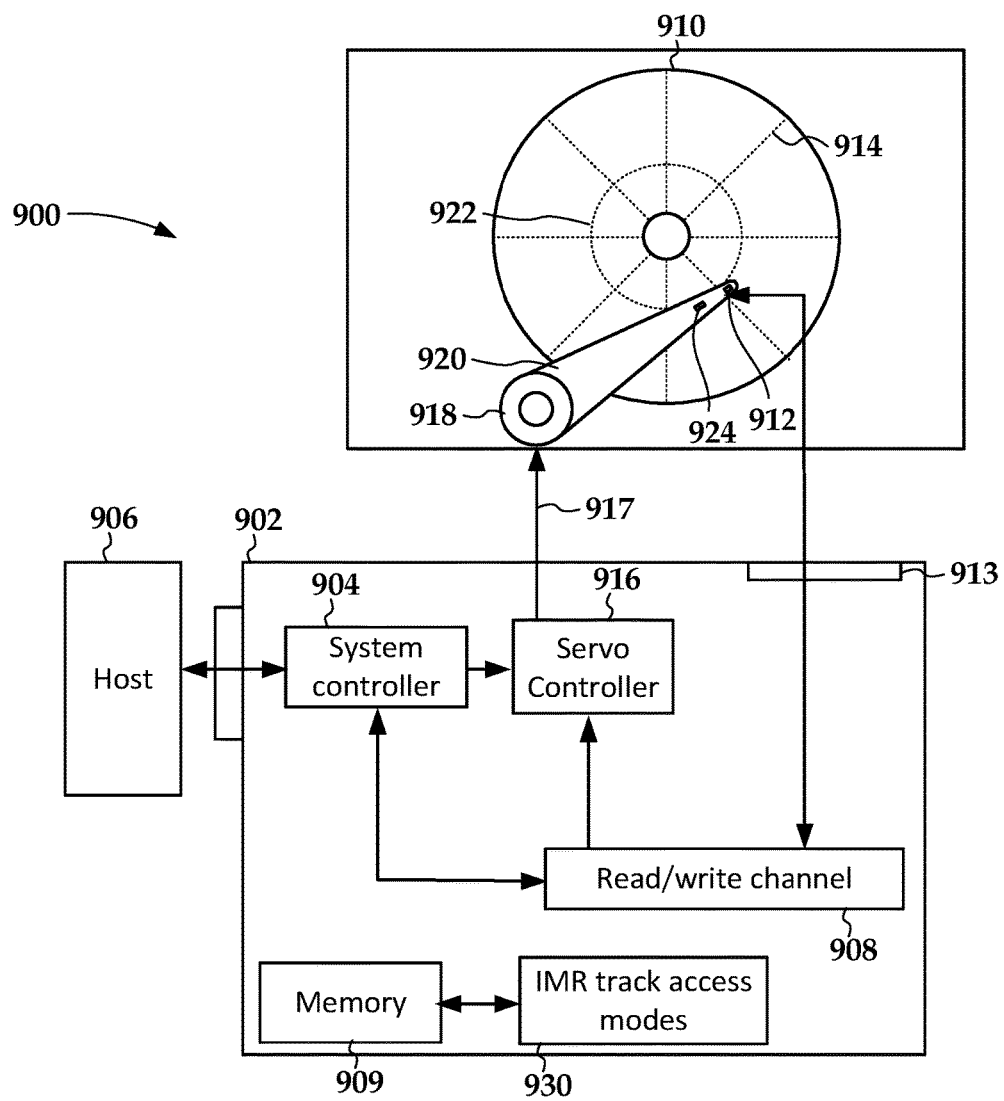
FIG. 9 is a diagram of a system and apparatus according to an example embodiment.

In FIG. 9, a diagram illustrates components of a storage drive apparatus 900 that utilizes one or more read/write heads 912 according to example embodiments. The apparatus includes circuitry 902 such as a system controller 904 that processes read and write commands and associated data from a host device 906. The host device 906 may include any electronic device that can be communicatively coupled to store and retrieve data from a data storage device, e.g., a computer. The system controller 904 is coupled to a read/write channel 908 that reads from and writes to surfaces of one or more magnetic disks 910.

The read/write channel 908 generally converts data between the digital signals processed by the system controller 904 and the analog signals conducted through two or more HGAs 912 during read operations. At least one of the HGAs 912 includes a head having at least one write transducer and first and second read transducers. The first read transducer has a first crosstrack width and a first shield-to-shield spacing that are optimized to read a first track width and a first linear bit density written to the disk 910. The second read transducer has a second crosstrack width different from the first crosstrack width and second shield-to-shield spacing different than the first shield-to-shield spacing. The second crosstrack width and the second shield-to-shield spacing are optimized to read a second track width different from the first track width and a second linear bit density different from the first linear bit density written to the disk 910.

The read/write channel 908 may include analog and digital circuitry such as decoders, timing-correction units, error correction units, etc. The read/write channel is coupled to the heads via interface circuitry 913 that may include preamplifiers, filters, digital-to-analog converters, analog-to-digital converters, etc. The read/write channel 908 may be configured to process MSMR signal, which include at least two signals from two read transducers that are reading the same track. The signals are combined to, e.g., detect and decode data recorded to the disk 910 via the heads.

The read/write channel 908 may have particular features that facilitate IMR reading and writing. For example, different channel configurations (e.g., parameters for write signals, decoding, timing correction, error correction, etc.) may be used depending on whether a top or bottom track is currently being written/read. If the read/write head 912 includes multiple writers, the read/write channel 908 may send write data to multiple writers or to a selected subset of the writers during certain phases of write operations. The multiple writers may be of different type (e.g., HAMR, conventional) and may have different characteristics (e.g., crosstrack width, downtrack resolution, signal-to-noise ratio, skew, reader-to-writer offset, etc.) The read/write channel 908 may be configured to read and write data differently for different zones of disk 910. For example, some zones may use different writing formats such as shingled magnetic recording (SMR), IMR, and conventional tracks.

In addition to processing user data, the read/write channel 908 reads servo data from servo wedges 914 on the magnetic disk 910 via the read/write head. All of the multiple readers of the read/write head may be used to read servo data, or only a subset thereof. The servo data are sent to a servo controller 916, which uses the data to provide position control signals 917 to a VCM 918. The VCM 918 rotates an arm 920 upon which the read/write heads 912 are mounted in response to the control signals 917. The position control signals 917 may also be sent to microactuators 924 that individually control each of the read/write heads 912, e.g., causing small displacements at each head.

A IMR track access module 930 is operable to selecting the first read transducer for reading a first set of tracks written to the disk 910 having the first track width and the first linear bit density. The module 930 is also operable to select the second read transducer for reading a second set of tracks interlaced between the first set of tracks, the second set of tracks having the second track width and the second linear bit density. The module 930 may be configured to change which read transducers read which tracks and in which mode (e.g., conventional, MSMR) the tracks are read and processed. For example, zones on the disk 910 that result in large skew angles of the arm when reading may favor certain combinations of transducers and modes compared to combinations/modes used in regions that are read at smaller skew angles.

Figure 10:
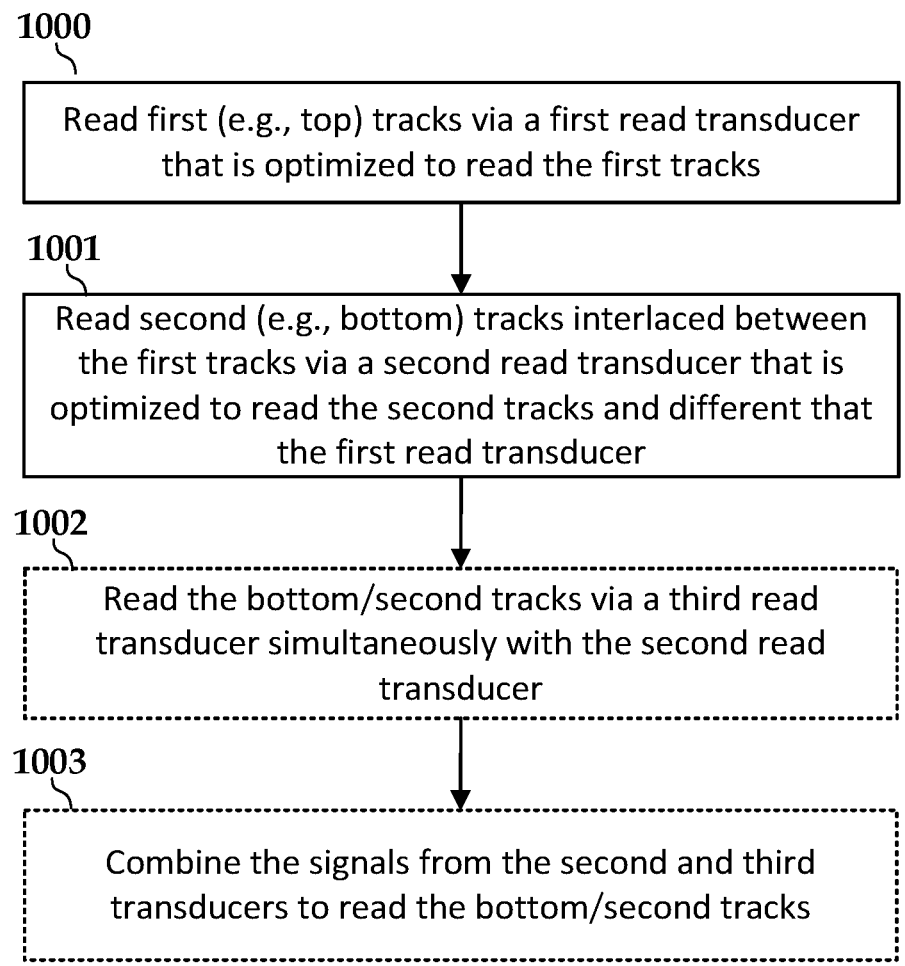
FIG. 10 is a flowchart of a method according to an example embodiment.

In reference now to FIG. 10, a flowchart illustrates a method according to an example embodiment. The method involves reading 1000 first tracks via a first read transducer. The first read transducer has a first crosstrack width and a first shield-to-shield spacing that are optimized to read a first track width and a first linear bit density of the first tracks. Second tracks interlaced between the first tracks are read 1001 via a second read transducer. The second read transducer has a second crosstrack width different from the first crosstrack width and second shield-to-shield spacing different than the first shield-to-shield spacing. The second crosstrack width and the second shield-to-shield spacing are optimized to read a second track width different from the first track width and a second linear bit density different from the first linear bit density.

In some embodiments, the first and second tracks are top and bottom tracks. In such a case, the method may further involve reading 1002 the bottom tracks via a third read transducer coupled to read the bottom tracks simultaneously with the second transducer. The signals from the second and third transducers are combined 1003 (e.g., via a multiple signal/sensor magnetic recording read channel) to read the bottom tracks.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a read head, comprising:
      a first read transducer comprising a first crosstrack width and a first shield-to-shield spacing that are optimized to read a first track width and a first linear bit density;
      a second read transducer comprising a second crosstrack width different from the first crosstrack width and second shield-to-shield spacing different than the first shield-to-shield spacing, the second crosstrack width and the second shield-to-shield spacing optimized to read a second track width different from the first track width and a second linear bit density different from the first linear bit density; and
   a controller coupled to the read head and operable to perform:
      selecting the first read transducer for reading a first set of tracks having the first track width and the first linear bit density; and
      selecting the second read transducer for reading a second set of tracks interlaced between the first set of tracks, the second set of tracks having the second track width and the second linear bit density.

2. The apparatus of claim 1, wherein the first and second tracks are respective top and bottom tracks in an interlaced magnetic recording arrangement.

3. The apparatus of claim 2, wherein the first and second read transducers have respective first and second widths that are respective first and second percentages of magnetic widths of the top and bottom tracks, the first percentage being less than the second percentage.

4. The apparatus of claim 3, wherein the first percentage improves bit transition times when reading the top tracks due to rounding of bit transitions that are written using heat-assisted magnetic recording.

5. The apparatus of claim 2, further comprising a third read transducer coupled to read the bottom tracks simultaneously with the second transducer, signals from the second and third transducers being combined using multiple signal/sensor magnetic recording read channel to read the bottom tracks.

6. The apparatus of claim 5, wherein one of the second and third read transducers is aligned in a downtrack direction with the first read transducer.

7. The apparatus of claim 1, wherein the first and second read transducers are aligned in a downtrack direction on the read head, and separated a cross-track distance that is greater than a track pitch of a recoding medium upon which the first and second tracks are recorded.

8. The apparatus of claim 1, wherein the first and second read transducers are separated by a cross track distance that allows the first and second read transducers to read adjacent ones of the first and second tracks.

9. The apparatus of claim 1, wherein the first and second read transducers have first and second sensor heights in a direction perpendicular to an air-bearing surface of the readers, the first and second sensor heights optimized to read the respective first and second track widths and the respective first and second linear bit densities.

10. The apparatus of claim 1, wherein the first and second read transducers have first and second sensor layer thicknesses, the first and second sensor layer thicknesses optimized to read the respective first and second track widths and the respective first and second linear bit densities.

11. The apparatus of claim 1, wherein the first and second read transducers have first and second side shield widths, the first and second sensor layer widths optimized to read the respective first and second track widths and the respective first and second linear bit densities.

12. A method, comprising:
   reading first tracks via a first read transducer, the first read transducer comprising a first crosstrack width and a first shield-to-shield spacing that are optimized to read a first track width and a first linear bit density of the first tracks; and
   reading second tracks interlaced between the first tracks via a second read transducer, the second read transducer comprising a second crosstrack width different from the first crosstrack width and second shield-to-shield spacing different than the first shield-to-shield spacing, the second cross-track width and the second shield-to-shield spacing optimized to read a second track width different from the first track width and a second linear bit density different from the first linear bit density.

13. The method of claim 12, wherein the first and second tracks are respective top and bottom tracks in an interlaced magnetic recording arrangement.

14. The method of claim 13, wherein the first and second read transducers have respective first and second widths that are respective first and second percentages of magnetic widths of the top and bottom tracks, the first percentage being less than the second percentage, and wherein the first percentage improves bit transition times when reading the top tracks due to rounding of bit transitions that are written using heat-assisted magnetic recording.

15. The method of claim 13, further comprising:
   reading the bottom tracks via a third read transducer coupled to read the bottom tracks simultaneously with the second transducer; and
   combining the signals from the second and third transducers via a multiple signal/sensor magnetic recording read channel to read the bottom tracks.

16. An apparatus, comprising:
   a head comprising at least one write transducer and first and second read transducers; the first read transducer comprising a first crosstrack width and a first shield-to-shield spacing that are optimized to read a first track width and a first linear bit density, the second read transducer comprising a second crosstrack width different from the first crosstrack width and second shield-to-shield spacing different than the first shield-to-shield spacing, the second crosstrack width and the second shield-to-shield spacing optimized to read a second track width different from the first track width and a second linear bit density different from the first linear bit density; and
   a controller coupled to the head and configured to:
      record top and bottom interlaced magnetic recording tracks, the top tracks recorded at the first track width and the first linear bit density, the bottom tracks recorded at the second track width and the second linear bit density; and
      read the top tracks via the first reader and read the bottom tracks via the second reader.

17. The apparatus of claim 16, wherein the first and second read transducers have respective first and second widths that are respective first and second percentages of magnetic widths of the top and bottom tracks, the first percentage being less than the second percentage.

18. The apparatus of claim 17, wherein the first percentage improves bit transition times when reading the top tracks due to rounding of bit transitions that are written using heat-assisted magnetic recording.

19. The apparatus of claim 16, further comprising a third read transducer coupled to read the bottom tracks simultaneously with the second transducer, signals from the second and third transducers being combined using multiple signal/sensor magnetic recording read channel to read the bottom tracks.

20. The apparatus of claim 19, wherein one of the second and third read transducers is aligned in a downtrack direction with the first read transducer.

* * * * *